United States Patent
Knospe et al.

(10) Patent No.: US 9,081,472 B2
(45) Date of Patent: Jul. 14, 2015

(54) DYNAMIC ENHANCEMENT OF CONTEXT MATCHING RULES FOR BUSINESS SCENARIO MODELS

(75) Inventors: Holger Knospe, Wiesloch (DE); Marianne Brosche, Heidelberg (DE); Ulrich Keil, Heidelberg (DE); Jochen Mayerle, Flein (DE); Joachim Fessler, Grafenberg (DE)

(73) Assignee: SAP SE, Walldorf (DE)

( * ) Notice: Subject to any disclaimer, the term of this patent is extended or adjusted under 35 U.S.C. 154(b) by 797 days.

(21) Appl. No.: 13/326,190

(22) Filed: Dec. 14, 2011

(65) Prior Publication Data

US 2013/0159906 A1 Jun. 20, 2013

(51) Int. Cl.
G06F 3/048 (2013.01)
G06F 3/0481 (2013.01)

(52) U.S. Cl.
CPC .................................. G06F 3/0481 (2013.01)

(58) Field of Classification Search
None
See application file for complete search history.

(56) References Cited

U.S. PATENT DOCUMENTS

| | | | |
|---|---|---|---|
| 5,819,103 A * | 10/1998 | Endoh et al. | 710/1 |
| 5,877,766 A * | 3/1999 | Bates et al. | 715/854 |
| 7,113,923 B1 | 9/2006 | Brichta et al. | |
| 7,280,793 B2 | 10/2007 | Zess et al. | |
| 7,711,694 B2 | 5/2010 | Moore | |
| 7,716,278 B2 | 5/2010 | Beringer et al. | |
| 7,735,022 B2 * | 6/2010 | Danninger et al. | 715/853 |
| 7,853,607 B2 | 12/2010 | Moore et al. | |
| 7,925,985 B2 | 4/2011 | Moore | |
| 8,046,716 B2 | 10/2011 | Nelson | |
| 8,181,150 B2 | 5/2012 | Szpak et al. | |
| 8,261,233 B2 | 9/2012 | Szpak et al. | |
| 8,332,405 B2 | 12/2012 | Wagenblatt et al. | |
| 8,468,491 B2 | 6/2013 | Markovic | |
| 8,621,421 B2 | 12/2013 | Klaka et al. | |
| 2002/0128890 A1 | 9/2002 | Dick et al. | |
| 2003/0154090 A1 | 8/2003 | Bernstein et al. | |
| 2003/0158832 A1 | 8/2003 | Sijacic et al. | |
| 2003/0216928 A1 | 11/2003 | Shour | |
| 2004/0010502 A1 | 1/2004 | Bomfim et al. | |
| 2004/0030992 A1 | 2/2004 | Moisa et al. | |
| 2004/0102990 A1 | 5/2004 | Jones | |
| 2004/0107414 A1 | 6/2004 | Bronicki et al. | |
| 2004/0119752 A1 | 6/2004 | Beringer et al. | |
| 2004/0181775 A1 | 9/2004 | Anonsen et al. | |

(Continued)

OTHER PUBLICATIONS

"Object Interactions in Graphical Interface for Print Administration." *IBM Technical Disclosure*. Oct. 1996.

(Continued)

*Primary Examiner* — Stephen Alvesteffer
(74) *Attorney, Agent, or Firm* — Mintz Levin Cohn Ferris Glovsky and Popeo, P.C.

(57) ABSTRACT

A definition of a new user interface feature of a business software architecture supporting a business configuration used by an organization can be received and a rule in a scenario model of a business scenario can be accordingly modified to associate the new user interface feature with business process feature(s) of the business scenario. A selection of a business process feature received as a user interaction with first user interface elements arranged in a linear order in a navigation pane of a user interface to represent at least some of the plurality of business process features of the business process can result in the concurrent display via the user interface of a work frame comprising the new user interface feature.

19 Claims, 7 Drawing Sheets

(56) References Cited

U.S. PATENT DOCUMENTS

| | | | |
|---|---|---|---|
| 2005/0004825 A1 | 1/2005 | Ehrler et al. | |
| 2005/0155000 A1* | 7/2005 | Weiler et al. | 715/840 |
| 2005/0262008 A1 | 11/2005 | Cullen et al. | |
| 2006/0005140 A1 | 1/2006 | Crew et al. | |
| 2006/0015383 A1 | 1/2006 | Beringer et al. | |
| 2006/0074703 A1 | 4/2006 | Bhandarkar et al. | |
| 2006/0074730 A1 | 4/2006 | Shukla et al. | |
| 2006/0074736 A1 | 4/2006 | Shukla et al. | |
| 2006/0074915 A1* | 4/2006 | Bhandarkar et al. | 707/9 |
| 2006/0149568 A1 | 7/2006 | Dreiling et al. | |
| 2006/0206348 A1 | 9/2006 | Chen et al. | |
| 2006/0206366 A1 | 9/2006 | Habib et al. | |
| 2007/0156649 A1 | 7/2007 | Fischer | |
| 2007/0162500 A1 | 7/2007 | Herwadkar | |
| 2007/0192715 A1 | 8/2007 | Kataria et al. | |
| 2007/0226038 A1 | 9/2007 | Das et al. | |
| 2007/0233508 A1 | 10/2007 | Gillespie | |
| 2007/0245300 A1 | 10/2007 | Chan et al. | |
| 2007/0265862 A1 | 11/2007 | Freund et al. | |
| 2007/0271526 A1 | 11/2007 | Powley | |
| 2007/0276714 A1 | 11/2007 | Beringer | |
| 2008/0040191 A1 | 2/2008 | Chakravarty et al. | |
| 2008/0052274 A1 | 2/2008 | Moore et al. | |
| 2008/0052358 A1 | 2/2008 | Beaven et al. | |
| 2008/0065675 A1 | 3/2008 | Bozich et al. | |
| 2008/0077530 A1 | 3/2008 | Banas et al. | |
| 2008/0140472 A1 | 6/2008 | Gilat et al. | |
| 2008/0168376 A1 | 7/2008 | Tien et al. | |
| 2008/0177622 A1 | 7/2008 | Akkiraju et al. | |
| 2009/0006146 A1 | 1/2009 | Chowdhary et al. | |
| 2009/0070698 A1 | 3/2009 | Shurtleff et al. | |
| 2009/0106640 A1 | 4/2009 | Handy et al. | |
| 2009/0210268 A1 | 8/2009 | Fan et al. | |
| 2010/0082292 A1 | 4/2010 | Pantaleano et al. | |
| 2010/0083374 A1* | 4/2010 | Schmitlin et al. | 726/21 |
| 2010/0121740 A1 | 5/2010 | Reed et al. | |
| 2010/0185474 A1 | 7/2010 | Frank | |
| 2011/0071869 A1 | 3/2011 | O'Brien et al. | |
| 2011/0082721 A1 | 4/2011 | Arni et al. | |
| 2011/0125756 A1 | 5/2011 | Spence et al. | |
| 2011/0145738 A1* | 6/2011 | Laugwitz et al. | 715/763 |
| 2012/0059842 A1 | 3/2012 | Hille-Doering et al. | |
| 2012/0090037 A1 | 4/2012 | Levit | |
| 2012/0136693 A1 | 5/2012 | Patil et al. | |
| 2012/0311451 A1 | 12/2012 | Beaven | |
| 2013/0024795 A1 | 1/2013 | Robotham et al. | |
| 2013/0159007 A1 | 6/2013 | Brosche et al. | |
| 2013/0159034 A1 | 6/2013 | Herter et al. | |
| 2013/0159036 A1 | 6/2013 | Keil et al. | |
| 2013/0159037 A1 | 6/2013 | Keil et al. | |
| 2013/0159047 A1 | 6/2013 | Mayerle et al. | |
| 2013/0159060 A1 | 6/2013 | Steinbach | |
| 2013/0159061 A1 | 6/2013 | Fessler et al. | |
| 2013/0159063 A1 | 6/2013 | Fessler et al. | |
| 2013/0159199 A1 | 6/2013 | Keil et al. | |
| 2013/0159896 A1 | 6/2013 | Mayerle et al. | |
| 2013/0159898 A1 | 6/2013 | Knospe et al. | |
| 2013/0159907 A1 | 6/2013 | Brosche et al. | |
| 2013/0159908 A1 | 6/2013 | Mayerle et al. | |

OTHER PUBLICATIONS

Rockwell Automation, Arena Training Course (2005).

* cited by examiner

DYNAMIC ENHANCEMENT OF CONTEXT MATCHING RULES FOR BUSINESS SCENARIO MODELS

CROSS-REFERENCE TO RELATED APPLICATIONS

The current application is related to the following co-pending and co-owned U.S. patent applications, the disclosure of each of which is incorporated herein in its entirety: Ser. Nos. 13/326,270, 13/325,546, 13/325,605, 13/325,632, 13/326,026, 13/326,052, 13/326,075, 13/326,207, 13/326,230, 13/326,254, 13/326,261, 13/326,266, and 13/326,279.

TECHNICAL FIELD

The subject matter described herein relates generally to enhancing user interaction with, and navigation among, features, functions, controls, and the like of an integrated software suite, such as for example an enterprise resource planning solution.

BACKGROUND

The complexity of business software architectures, such as for example enterprise resource planning (ERP) systems, can present substantial challenges to users and can be a serious obstacle to widespread operative use of process models in the software landscape. A wealth of highly technical process modeling notations (e.g. business process modeling notation (BPMN) editors and process engines, enhanced process chains (EPC), modeling hierarchies built on these or similar model types, etc.) is currently available for use in technical systems. However, these types of resources are typically difficult for a non-technical user to understand and use. While numerous non-technical tools exist for depicting high-level processes (e.g. drawing, mind-map, or presentation tools, or the like), such tools typically lack any operative connection with the underlying transactional data relating to specific instances of business scenarios or business processes in a business software architecture and therefore can provide only a picture of an idealized concept of a business scenario or business process.

Typical, day-to-day business users do not know and do not generally wish to learn the syntax of BPMN or similar notations just to be able to match their business needs with the features and capabilities of a business software solution. Notations like BPMN or EPC are generally addressed to a more technical audience and can be seen as powerful graphical programming languages that by their very nature are detail rich. For scenario or process modelers, it can be difficult to simplify a business scenario or business process model to a suitable abstraction level and to include only a necessary level of information. In real world organizations, business users have specific roles within the organization, i.e. they work as accountants, project managers, sales representatives etc. Therefore, business scenario or business process navigation and visualization tools are advantageously relevant for a specific target role. Business scenario or business process models of an organization can be integrated by nature. For example, sales processes trigger fulfilling, and fulfilling triggers accounting. Business users can have a need to understand, discuss, and adapt the transition points between end-to-end scenario or process chains in the software.

SUMMARY

In one aspect, a method includes receiving a definition of a new user interface feature of a business software architecture that supports a business configuration used by an organization. The business configuration includes a business scenario that includes a plurality of business process features having associated user interface features. A rule in a scenario model of the business is modified to associate new user interface feature with at least one of the plurality of business process features. A selection of the at least one of the plurality of business process features received as an input via a user interface presentable on a computer display device is detected. The input includes user interaction with at least one of a first plurality of user interface elements that are arranged in a linear order in a navigation pane of the user interface to represent at least some of the plurality of business process features of the business scenario. A work frame that includes the new user interface feature is displayed via the user interface concurrently with the navigation pane.

In some variations one or more of the following features can optionally be included in any feasible combination. The receiving can optionally occur via a process linkage editor displayed in the work pane upon selection of a linkage modification user interface element displayed in the navigation pane. The receiving alternatively optionally occur via a scenario linkage editor operable by a scenario administrator. The scenario administrator can have received a scenario modification feedback entered in the user interface by a business user who lacks sufficient permissions to modify the scenario model. The scenario modification feedback can optionally include a request to incorporate the new user interface feature. The new user interface feature can optionally relate to an external functionality provided by an software component external to, but integrated into, a core software platform of the business software architecture. The modifying can optionally further include associating the external functionality with the business process feature. The scenario model can optionally be stored, for example in a metadata repository, and the scenario model can optionally be used to support scenario navigation relevant to the business configuration. The scenario navigation can optionally provide an ability to directly change a link between one of the first plurality of user interface elements and its associated business process feature.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, administrator-level users in an organization can dynamically create "best practice" modifications to an existing business configuration of a business software architecture by use of a convenient, intuitive tool for enhancing correlation rules between user interface features and business process features. These enhancements can be quickly (if not immediately) reflected in process models storing metadata relating to the various business processes in the business configuration. An ordinary business user (e.g. a user without administrator permissions) can also quickly personalize correlations between user interface features and business process features according to his or individual user preferences and personal working requirements. Using one or more implementations of the current subject matter, an organization can easily define its own best practices (for example regarding navigation and process context display, and publish them immediately or at least very rapidly to all business users within the organization via changes made to a process repository that underlies process navigation. These changes can be made via a simple visual editor that can optionally include proposals for default settings. To the extent that a given business user has adequate permissions, he or she can also make customizations at a local level to reflect, enhance, etc. his or her daily work flow or personal preferences.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Currently available business software architectures, including for example enterprise resource planning (ERP) systems and the like, generally do not include functionality permitting a business user to access a convenient overview of a concrete instance of a business function or to readily navigate through features, functions, etc. of the business software architecture in a manner that intuitively follows the progress of a specific instance of the business scenario or business process. Incorporation of customizations to a core software platform of a business software architecture after initial scoping of an organization's business configuration can be challenging. Further complexity can result from a desire to allow an individual business user to modify his or her user interface work space, either to include functionality provided by an external software component, for example via adding one or more features or functions or user interface work centers, etc. created or provided by software or other application services that are not part of or otherwise external to the core software platform.

To address these and potentially other issues with currently available solutions, methods, systems, articles of manufacture, and the like consistent with one or more implementations of the current subject matter can, among other possible advantages, provide a mechanism to dynamically modify and/or personalize metadata that enable scenario or process navigation. Individual business users as well as the organization as a whole can benefit from the ability to conveniently and rapidly integrate additional functionality into a business configuration of a business software architecture according to permissions and defined compatibility and usability rules. According to implementations of the current subject matter, a correlation engine can dynamically match a current user context with one (or in some examples more than one) business process feature of a specific instance of a business scenario or business process supported by the business software architecture as is it is configured within a scenario landscape of the organization. Business process features of one or more specific instances of business scenarios or business processes that match the business user's current context can be highlighted, as can additional activity options relating to those specific instances.

A scenario landscape for an organization can refer to a set including all or some of the business scenarios and/or business processes characterizing an organization's operations. In general a business scenario can includes one or more business processes, process steps, or other business process features. Business process features can include, but are not limited to, one or more of business processes, process steps, sub-processes, tasks, activities, and the like. The business scenarios and business processes can be managed, and tasks relating to the completion of one or more steps of the business processes can be supported by, one or more feature modules of a business software architecture, such as for example an enterprise resource planning (ERP) system. The terms "instance of a business process," "instance of a business scenario," and similar descriptive terminology is intended to refer to a specific execution of a business process or a business scenario, respectively. For example, for a business scenario relating to sale of a product, each order taken and filled for that product can be considered as an instance of the business scenario. A business configuration can be a set of business scenarios including sets of business processes or business process features supported by the business software architecture and optionally customized to reflect the actual, real-life business functions (e.g. end-to-end business processes) performed by employees or other organization members on a recurring basis. A business configuration for an organization customer of a business software architecture is usually set up upon initial installation with occasional modifications or updates provided to reflect changes to the underlying real-life processes and procedures. Such a business configuration is typically constructed like a catalog, and its functions can be structured according to business areas, packages, topics and options. Once the initial business configuration is set up, all decisions are made, and the scoping is done, the business software architecture is ready for productive usage. The term "master data" generally refers to information that is key to the operation of a business and that typically changes either not at all or on time scales substantially longer than transactional data. Such information can include, but is not limited to, data about customers, products, employees, materials, suppliers, etc. which is non-transactional in nature. Master data can support transactional processes and operations, but can also be used in analytics, reporting, etc. and is often used by several functional groups and stored in different data systems across an organization.

Using one or more implementations of the current subject matter, a user need not navigate through an entire business configuration to identify a necessary user interface screen or element to make a change to the business configuration. Mapping information between business scenarios, business processes, process steps, sub-processes, tasks or features related thereto, or other aspects of a business software architecture and a specific configuration setting corresponding to these aspects of the business software architecture can be stored in a business scenario meta-model. The business scenario meta-model can provide mapping information between a business software architecture aspect and a corresponding location in the business configuration. An additional benefit can be realized in that changes made to the settings of the business configuration can be immediately (or at least rapidly) be reflected in the corresponding view of a business scenario or business process for all users of the business software architecture.

The quality of any business scenario- or business process-based navigational approach can depend on the quality of the content in the underlying scenario or process repository. Creating first class content up-front can be tedious and can require a wealth of experience. Even under ideal conditions, however, scenario or process model content may never fully match the expectations of each group of users or even the expectations of each individual user. Implementations of the current subject matter can empower each user within an organization to contribute to the content of the scenario or process repository by adapting it to their expectations and known best practices. Administrator-level users can enhance the content for entire groups of users, while individuals can customize the system to their specialized needs or preferences. Content extension and/or adoption can be supported by auto-generating proposals, partial proposals, or the like for links between business process features and user interface features and by narrowing down the possible choices. A user can thereby be freed form the need to understand the typically comprehensive technological background behind content-to-process or content-to-scenario correlations.

A scenario landscape map such as is described herein can serve as an integrated part of a business software solution and can include one or more of the following capabilities. In some implementations, a scenario landscape map can provide a visualization of business scenarios and/or business processes in an organization's current business configuration using a transit-map style, for example using a visual analog to a geographical map in the form of a schematic diagram in which routes and stations of a public transport system represent scenario flow and actions that are performed in the execution of a business scenario or business process. The scenario landscape map can translate scenario flows visualized as route lines into end-to-end business scenarios, and stations or stops visualized as labeled icons into business processes and/or other business process features. A business user or prospective business user can thereby be assisted in efficiently understanding, discussing, and/or adjusting the underlying business scenario model of an business software solution in either or both of the software sales and software implementation cycles. Unlike more technical displays of business scenario information (e.g. business process modeling notation or the like), the scenario landscape map deliberately uses a pre-calculated level of reduced detail and accuracy in representing business scenario model semantics. Instead, the scenario landscape map, which can also be referred to as a scenario browser or the like, makes use of straight lines, fixed angles, and/or other relatively simply geometric shapes, and can make use of an approximately similar, fixed distance between "stops" on the route line (each of which can represent a process, process step, or other business process feature) while hiding actual complications (e.g. decision trees, loops, branches, alternative routes, etc.) of the "real" underlying business scenario flow and, optionally, end-to-end scenario dependencies as well. Such an approach can create a simplified, linear abstracted visualization of the underlying software reality that provides just the right degree of detail for business-focused discussions.

Continuing with the analogy to transit maps, non-relevant or less relevant aspects of reality (e.g. pedestrian routes, buildings, rivers, etc.) can be excluded from the visualization to provide only the key information necessary to assist a "rider" (e.g. a user) in getting from a starting location to a destination. In a visualization model consistent with implementations of the current subject matter, "stations" (e.g. process steps, sub-processes, etc. represented visually as points along the route line) that serve as interchanges between lines can be thought of as analogous to one or more integration or intersection points between end-to-end business scenarios.

The scenario landscape map or process scenario need not be a static, "birds eye" view of a business scenario landscape, but can instead serve to focus information that is most relevant to a currently active business scenario, for example by positioning a route line representing the currently active business scenario in the approximate center of a scenario landscape map view with other integrated or intersecting business scenarios that form part of the business scenario landscape displayed in relation to the currently active business scenario. In another example, a most relevant business scenario of a specific role can be positioned in this manner with the most relevant business scenario being represented as a route line in the approximate center of the scenario landscape map view.

A scenario landscape map or scenario browser can also enable seamless zoom-in and zoom-out across an entire business process model of the organization in a manner similar to electronic geographical maps. A single scenario navigation tool, for example one as described in the above-referenced related applications or as described below, can also be launched via the scenario landscape map or scenario browser to allow switching from a scenario landscape view to a transactional data processing mode.

Figure 1:
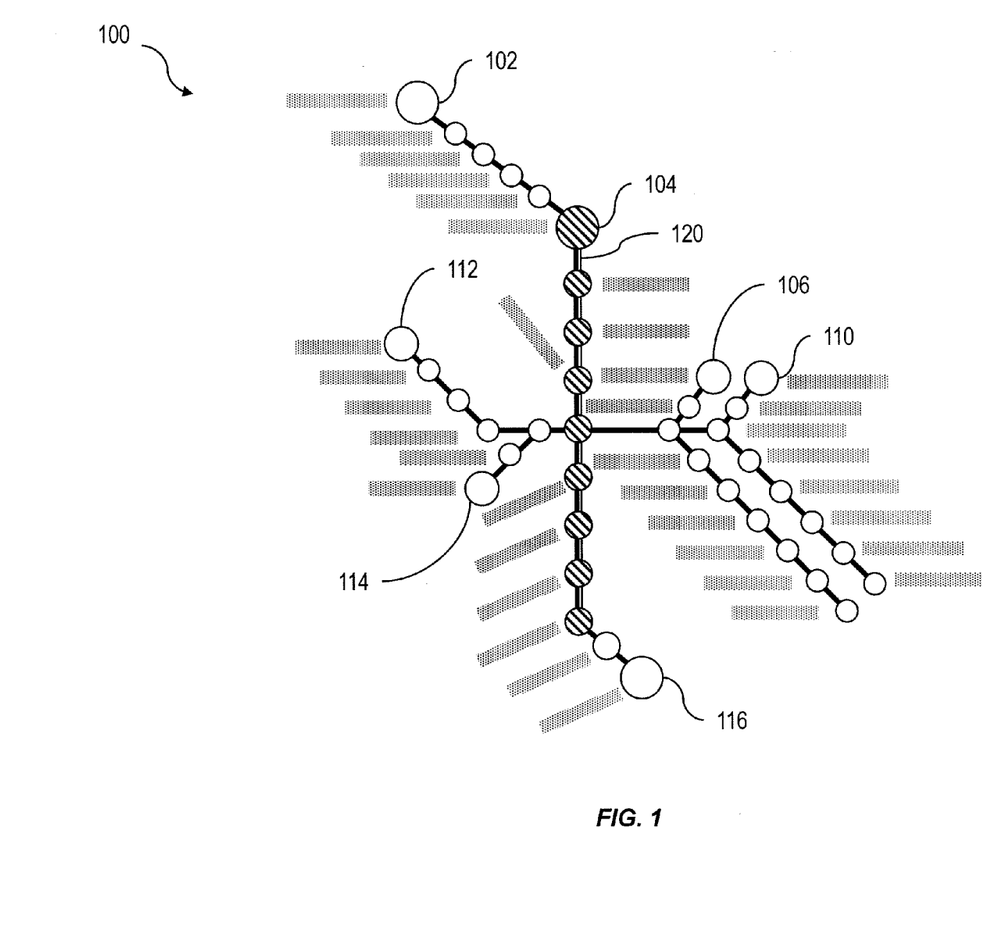
FIG. 1 shows a screenshot of a user interface illustrating a scenario landscape overview view.

FIG. 1 illustrates an example of a scenario landscape overview map or scenario browser 100, which includes relational links between a plurality of business processes in a scenario landscape. Each of several business scenarios 102, 104, 106, 110, 112, 114, 116 are shown at a linear overview degree of detail to depict the relations between the different business scenarios 102, 104, 106, 110, 112, 114, 116 in the scenario landscape. In an implementation, the scenario landscape overview map 100 can be modeled as a transit map that shows the place and the function of each business scenario in the scenario landscape as a whole. Intrinsic relation types between the business scenarios 102, 104, 106, 110, 112, 114, 116 can include, but are not limited to, a predecessor scenario, which is defined as a business scenario whose completion is a prerequisite to another business scenario (e.g. business scenario 102, which includes several business processes or other business process features (shown in FIG. 1 as smaller circles) that lead to the initiation of business scenario 104); a successor scenario, which is defined as a business scenario having a predecessor scenario (e.g. business scenario 104, which has business scenario 102 as its predecessor scenario); a joint use scenario, which is defined as a business scenario that shares a common business process or other common business process feature, a common data object, a common responsible entity (e.g. a person, a unit, etc.), a common event, or the like (e.g. business scenarios 106 and 110, which share business process features with business scenario 112; or business scenario 116 and business scenario 104, which share a business process or other business process feature); and a hierarchical use scenario, which is defined as a business scenario that uses another business process or business scenario as a sub-scenario (e.g. business scenario 112, which includes as a branching sub-scenario the business scenario 114). Also as shown in FIG. 1, the business scenarios and/or the included business processes or business process features can be labeled in a manner similar to stops on a transit map.

The scenario landscape overview map 100 can advantageously be arranged in a scenario-centric manner, for example such that a selected business scenario 104 is arranged approximately centrally in the overview diagram with other business scenarios (e.g. including but not limited to the business scenario relationships explained in the preceding paragraph) relating to the selected business scenario 104 shown branching or intersecting with the selected business scenario 104. The selected business scenario 104 can optionally be a business scenario that is most relevant to a current role of a user, a currently active business scenario, or the like. The scenario overview map 100 can also advantageously include one or more visual cues to indicate information about the various business scenarios, business processes, and/or the business process features shown in the scenario overview map 100. For example, the route line 120 of the selected business scenario 104 can be shown in a different thickness, with a different pattern, in a different color or brightness, or the like, and the business processes or business process features of the selected business scenario 104 can likewise be shown with a different pattern, color, brightness, etc. Clicking on a business process or business process feature of the selected business scenario 104 can directly navigate a user to a linear single scenario view of the currently active business scenario displayed simultaneously with a work space including user interface elements related to completion, monitoring, etc. of the selected business process or business process feature. Clicking on a business process or business process feature of another scenario besides the selected business scenario 104 can cause the scenario overview map 100 to rearrange to show the scenario landscape with a new scenario-centric view based on the newly selected business scenario.

Figure 2:
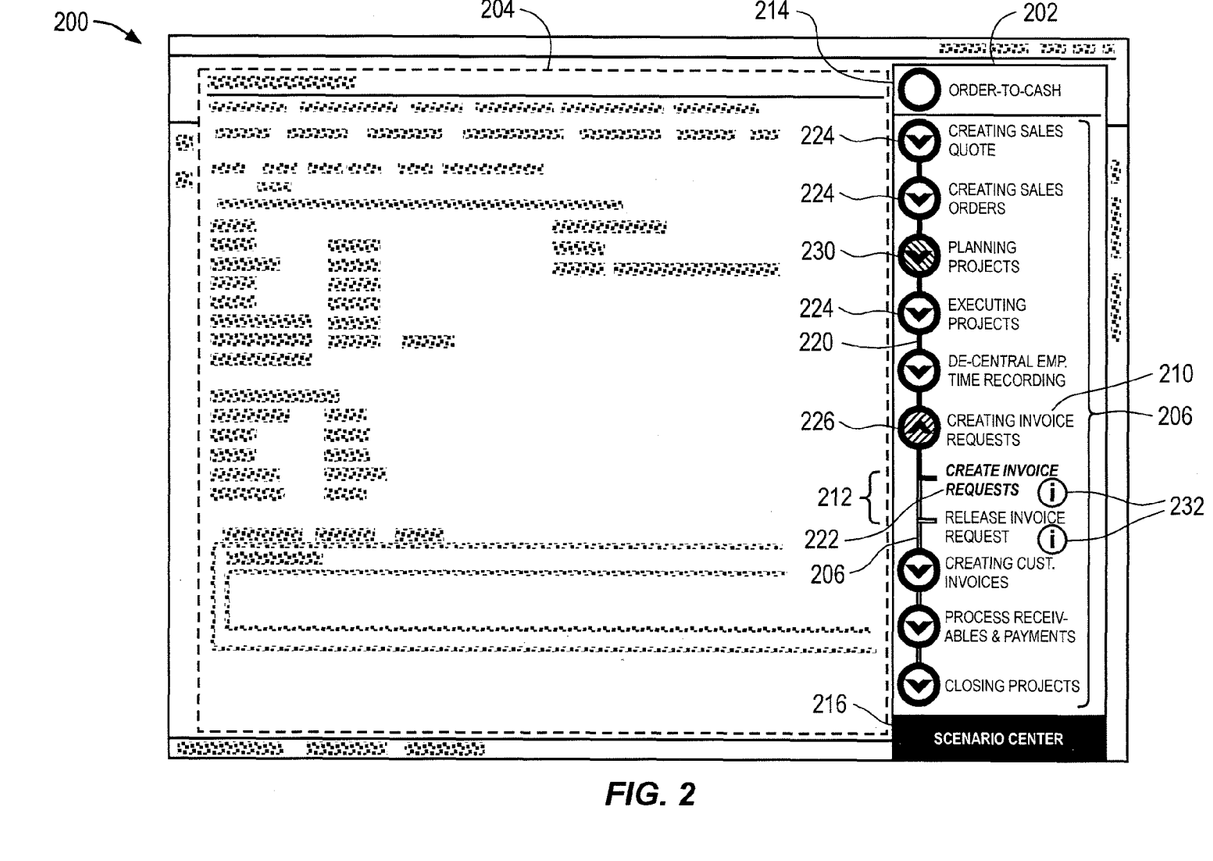
FIG. 2 shows another screenshot of a user interface illustrating a linear single business process view and associated user interface features for guided modification of aspects of a business process.

FIG. 2 illustrates an example of a linear single scenario view 200, which shows a single business scenario as a linear sequence of business processes or other business process features that can include process steps, sub-processes, tasks within sub-processes, and the like. The structure of the business scenario is condensed into a linear view, even though the actual flow of tasks and other actions necessary to complete an instance of the business scenario often involves explicit parallelism, decisions, loops, event driven changes in control flow, exceptions, and the like. Consistent with the scope of the current subject matter, any viable approach can be used to shape a business scenario into such a linear view.

As shown in FIG. 2 a scenario navigation pane 202 and a work pane 204 are concurrently displayed. A plurality of first user interface elements 206 are displayed in the scenario navigation pane 202 and arranged in a linear progression to represent the linear sequence of business processes or other business process features in the scenario model of the currently actively business scenario. A first user interface element 210 corresponding to a business process having additional embedded process steps can be expanded as shown in FIG. 2 to display additional user interface elements 212 corresponding to the process steps. Also as shown in FIG. 2, the currently displayed business scenario can be identified by one or more scenario identifier user elements 214. A scenario browser user interface element 216 can link to the upper level scenario landscape overview map 100 to display a scenario landscape overview map 100 showing intersections between scenarios and providing links to navigate to the other scenarios in the scenario landscape.

The first user interface elements 206 can be displayed in a manner similar to a transit route map with each business process or business process feature being represented like a stop on the route. In this manner, a familiar visual format can rapidly convey additional information about a current context within a specific instance of the business scenario as well as status information about the various business processes or other business process features along the "route" to completion of the instance. For example, a route line 220 connecting the "stops" can be presented with a first visual effect (e.g. color, brightness, shade, dots or dashes, etc.) up to the "stop" representing the business process feature that is currently selected with related functionality being provided in the work pane 204. The currently selected business process feature can be further indicated using textual or visual cues, such as for example color, shading, font, a highlighting box, etc. As a non-limiting example, the name of the business process feature displayed in conjunction with the user interface element 222 corresponding to the currently selected business process feature in FIG. 2 is formatted in a bold and italicized font. A different second visual effect can be used for the route line 220 leading to the "stops" past the currently selected business process feature. The icons 224 used to represent the "stops" in the scenario navigation pane can also include visual cues to inform a user about status, other business process features that are included within the currently displayed business process feature user interface elements and that can be revealed by a user action to expand the route map, or the like.

Also in the example shown in FIG. 2, the expanded business process 210 is includes business process features that are illustrated by first user elements 212 incorporated directly into the route map without branching to maintain the linear progression of the scenario model. The first user interface element 226 representing the "stop" corresponding to this business process 210 can include visual presentation features to indicate that it is currently expanded as shown in FIG. 2, while another first user interface element 230 representing a "stop" corresponding to another expandable business process having additional, currently undisplayed business process features can include visual presentation features to indicate that it is currently not expanded but capable of being expanded. Additional first user interface elements 232 (e.g. the "i" icons shown in FIG. 2) can provide a link to a customization screen that can be displayed in the work pane 204 to allow a user to modify a link between a corresponding business process feature and second user interface elements to be displayed in the work pane 204 during execution of an instance of the business scenario.

Figure 3:
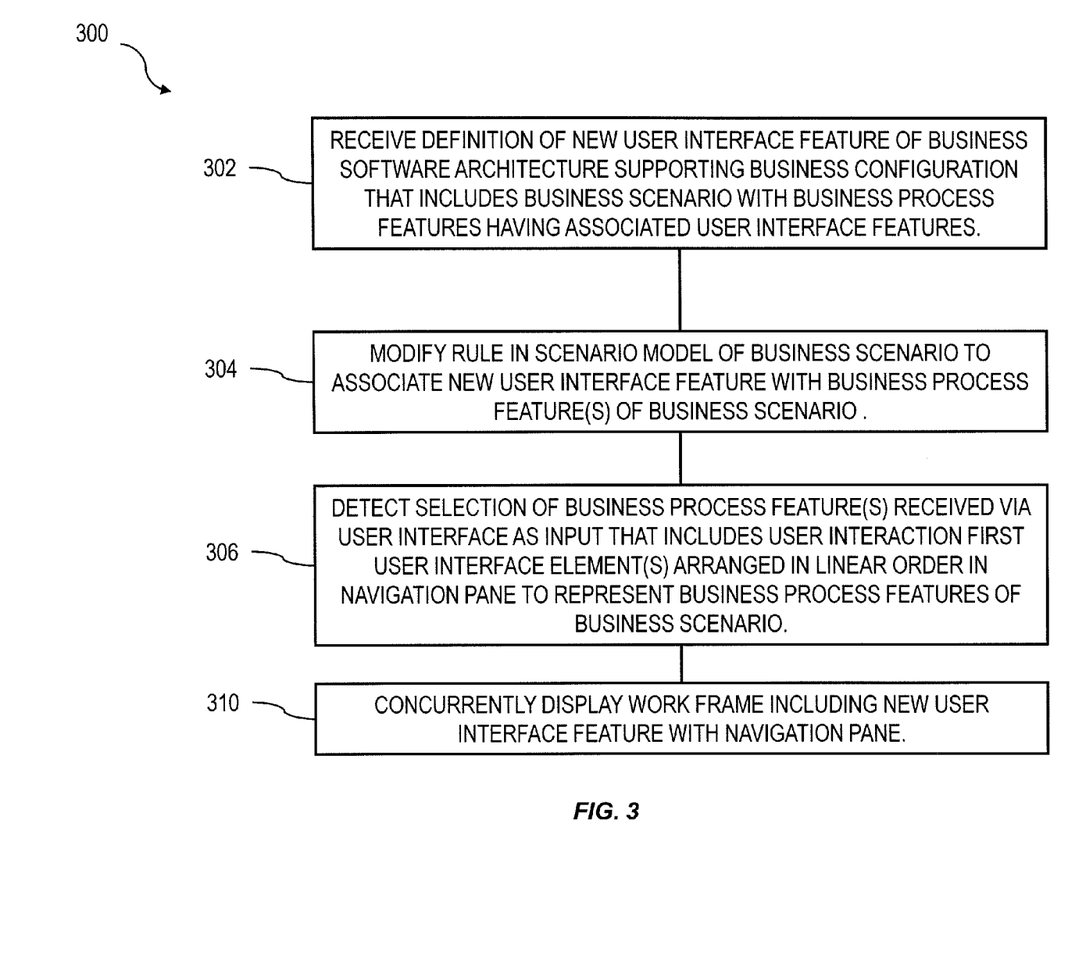
FIG. 3 is a process flow diagram illustrating aspects of a method having one or more features consistent with implementations of the current subject matter.

FIG. 3 shows a process flow chart 300 illustrating a method having one or more features consistent with implementations of the current subject matter. At 302, a definition of a new user interface feature of a business software architecture that supports a business configuration used by an organization is received. The new user interface feature can optionally relate to an external functionality provided by an application service external to, but integrated into, a core software platform. The business configuration includes a business scenario including a plurality of business process features having associated user interface features. At 304, a rule in a scenario model of the business scenario is modified to associate the new user interface feature, and optionally the external functionality, with at least one of the plurality of business process features. A selection of the at least one of the plurality of business process features received as an input via a user interface presentable on a computer display device is detected at 306. The input includes user interaction with at least one of a first plurality of user interface elements that are arranged in a linear order in a navigation pane of the user interface to represent at least some of the plurality of business process features of the business scenario. A work frame comprising the new user interface feature is concurrently displayed, via the user interface, with the navigation pane at 310.

As noted above, when a user selects a business process feature, for example via selection (e.g. clicking on, right clicking on, tapping, highlighting, etc.) of one or more of the first user interface elements displayed in the navigation pane 202, the view in the work pane 204 shows second user interface elements relating to the business process feature(s) associated with the selected one or more of the first user interface elements. The second user interface features can be part of an application program, a work center view, a transaction screen, etc. that supports the user to perform activities relating to the selected business process feature. The correlation between business process features of a business scenario and specific user interface features as well as the ability to navigate between them according to a clear, intuitive process map can be based on meta information, including but not limited to metadata describing the underlying business scenario model and relationships to user interface features, business objects, etc. that support the functionality necessary to perform the activities associated with each business process feature.

A one-to-one correlation between a given business process feature and the user interface context supporting a user to perform activities related to that business process feature can be desirable. However, a pre-defined linkage between a business process feature and related user interface features may not be consistent with the needs of the organization, or alternatively with the needs of a specific business user or group of business users within the organization. Implementations of the current subject matter include tools to enable changing the metadata directly on one or more of a global basis (e.g. for a user with administrator or comparable permissions), a local basis (e.g. only for a subset of users), a personal basis (e.g. for a business user who wishes to modify workflow features or the like that he or she uses in performing tasks, or via an indirect request mechanism (e.g. for a business user without administrative permissions who wishes to suggest an improvement in the organization's business configuration) using a visual tool based on the scenario navigation pane 202.

Figure 4:
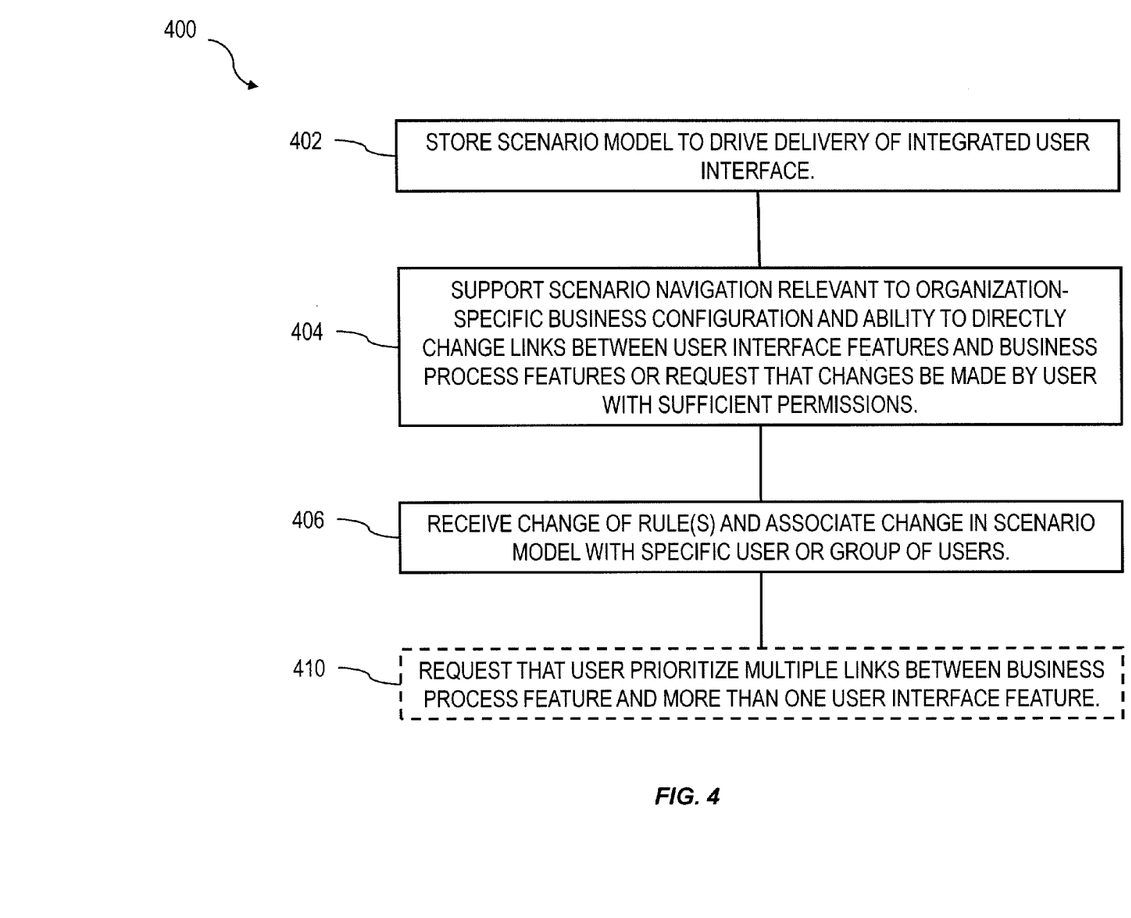
FIG. 4 is a process flow diagram illustrating aspects of a method having one or more features consistent with implementations of the current subject matter.

The process flow diagram 400 of FIG. 4 illustrates additional features consistent with one or more implementations of the current subject matter. A scenario model can be stored at 402, for example in one or more scenario repositories that includes metadata, rules, etc. to drive delivery of an integrated user interface. The integrated user interface can at 404 support scenario navigation relevant to an organization-specific business configuration and the ability to directly change links between user interface features and business process features or to request that such changes be made by a user with sufficient permissions. This support can include receiving, at 406 via a process link editor, a change of one or more rules in the scenario model and associating the change in the scenario model with a specific user or a group of users (optionally all users). Optionally at 410, if the scenario model includes multiple links between a business process feature and more than one different user interface context, a user can be requested to prioritize the links.

Definition of links between business process features and user interface features can optionally occur with system support. For example, the current context of a user can be automatically extracted from the underlying program, transaction, etc. with which the user is interacting. The target of the link can be chosen from a pre-filtered list of business process features that technically (e.g. in terms of a leading business object) match the context. Depending on the role of the user, the user's intention in extending the correlation information may vary. For example, a business process expert with an extensive overview of the organization's business needs and the task to improve the business process experience for all users may wish to make global changes that affect multiple users while a specialized worker may simply wish to improve his or her own interaction with the system. In the first case, a key user can add additional rules to scenario models and publish them for organization-wide use. In the second case, a normal business user can personalize the rules only for himself or herself. The editor can distinguish these two cases based on the role-based authorizations of the user.

Figure 5:
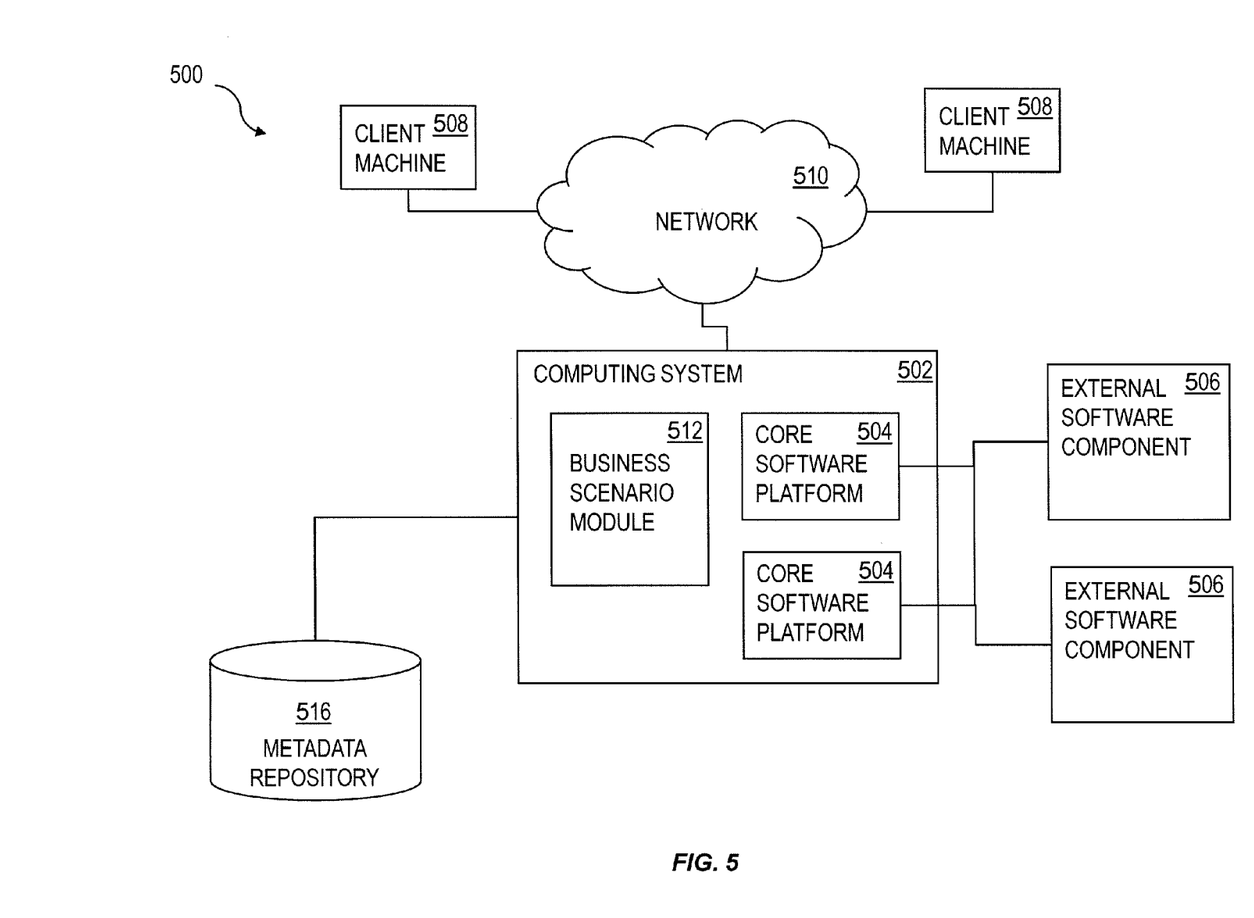
FIG. 5 is a diagram illustrating aspects of a system showing features consistent with implementations of the current subject matter.

The core software platform of an ERP or other business software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. FIG. 5 shows a diagram of a system consistent with such an implementation. A computing system 502 can include one or more core software platform modules 504 providing one or more features of the ERP system. The computing system can also aggregate or otherwise provide a gateway via which users can access functionality provided by one or more external software components 506, which can optionally be available from service providers external to the core software platform modules 504. Client machines 508 can access the computing system, either via a direct connection, a local terminal, or over a network 510 (e.g. a local area network, a wide area network, a wireless network, the Internet, or the like). A business scenario guidance and recording module 512 can be hosted on the computing system 502 or alternatively, on an external system accessible over a network connection. The business scenario guidance and recording module 512 can optionally include one or more discrete software and/or hardware modules that perform operations such as those described herein.

The business scenario guidance and recording module 512 can access one or more metadata repositories 516 and/or other data repositories that can store the definition of business processes and business configuration as well as data, metadata, master data, etc. relating to definitions of the business processes, the business configuration, and/or concrete instances of the data objects (e.g. business objects) that are relevant to a specific instance of the business process. In some examples, the definition can optionally be stored as a business object. In some implementations, the business object can include a template definition of a standard business process. The template definition that can optionally be modified via one or more extensions that are stored in the one or more metadata repositories 516.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
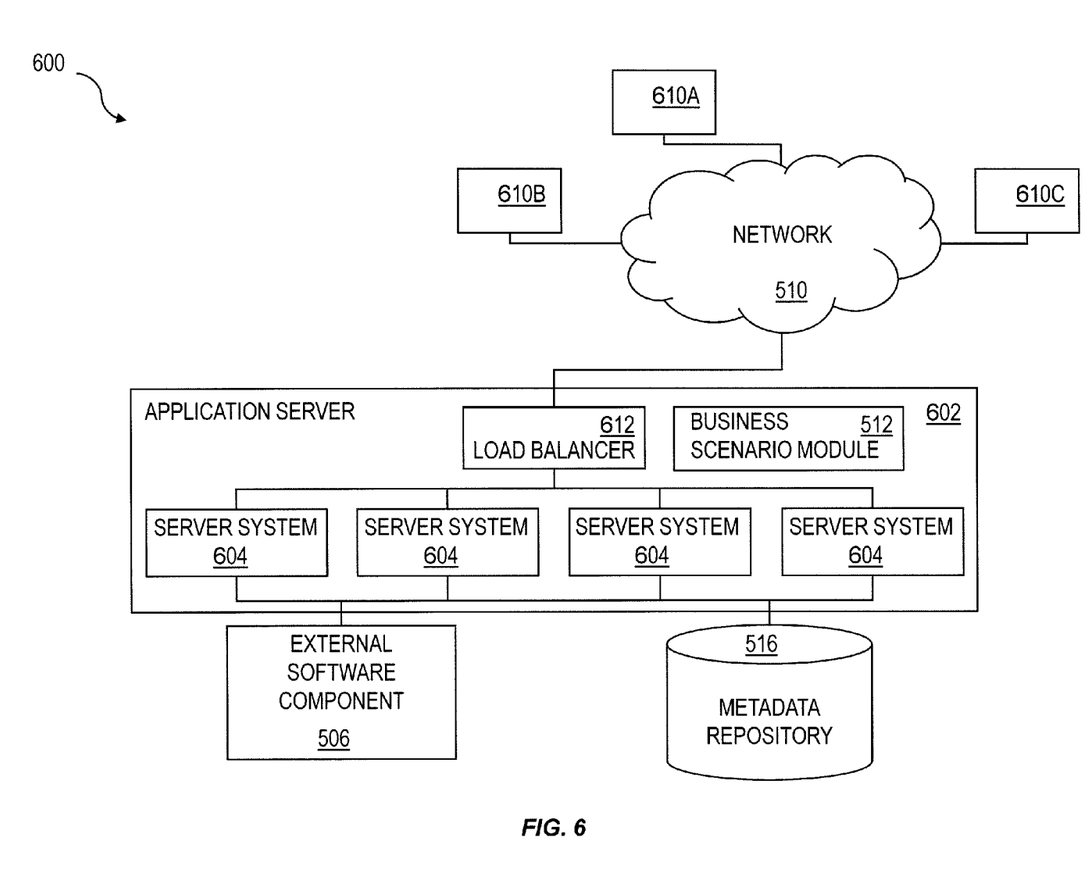
FIG. 6 is a diagram illustrating aspects of a system showing features consistent with implementations of the current subject matter.

FIG. 6 shows a block diagram of a multi-tenant implementation of a software delivery architecture 600 that includes an application server 602, which can in some implementations include multiple server systems 604 that are accessible over a network 510 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. Instances of the core software platform 504 (not shown in FIG. 6) can be executed in a distributed manner across the server systems 604. A user can access the software delivery architecture across the network using a thin client, such as for example a web browser or the like, or other portal software running on a client machine. The application server 602 can access data and data objects stored in one or more data repositories 516. The application server 602 can also serve as a middleware component via which access is provided to one or more external software components 506 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 602 that includes multiple server systems 604 that handle processing loads distributed by a load balancer 612. Potential benefits from such an arrangement can include, but are not limited to, high and reliably continuous application server availability and minimization of unplanned downtime, phased updating of the multiple server systems 604 to permit continuous availability (one server system 604 can be taken offline while the other systems continue to provide services via the load balancer 612), scalability via addition or removal of a server system 604 that is accessed via the load balancer 612, and de-coupled lifecycle processes (such as for example system maintenance, software upgrades, etc.) that enable updating of the core software independently of tenant-specific customizations implemented by individual tenants.

As in the example illustrated in FIG. 5, the metadata repository 516 can store a business object that represents a template definition of a standard business process. Each individual tenant 610A-610C can customize that standard template according to the individual business process features specific to business of the organization to which that tenant is assigned. Customizations can be stored as extensions in the metadata repository.

Figure 7:
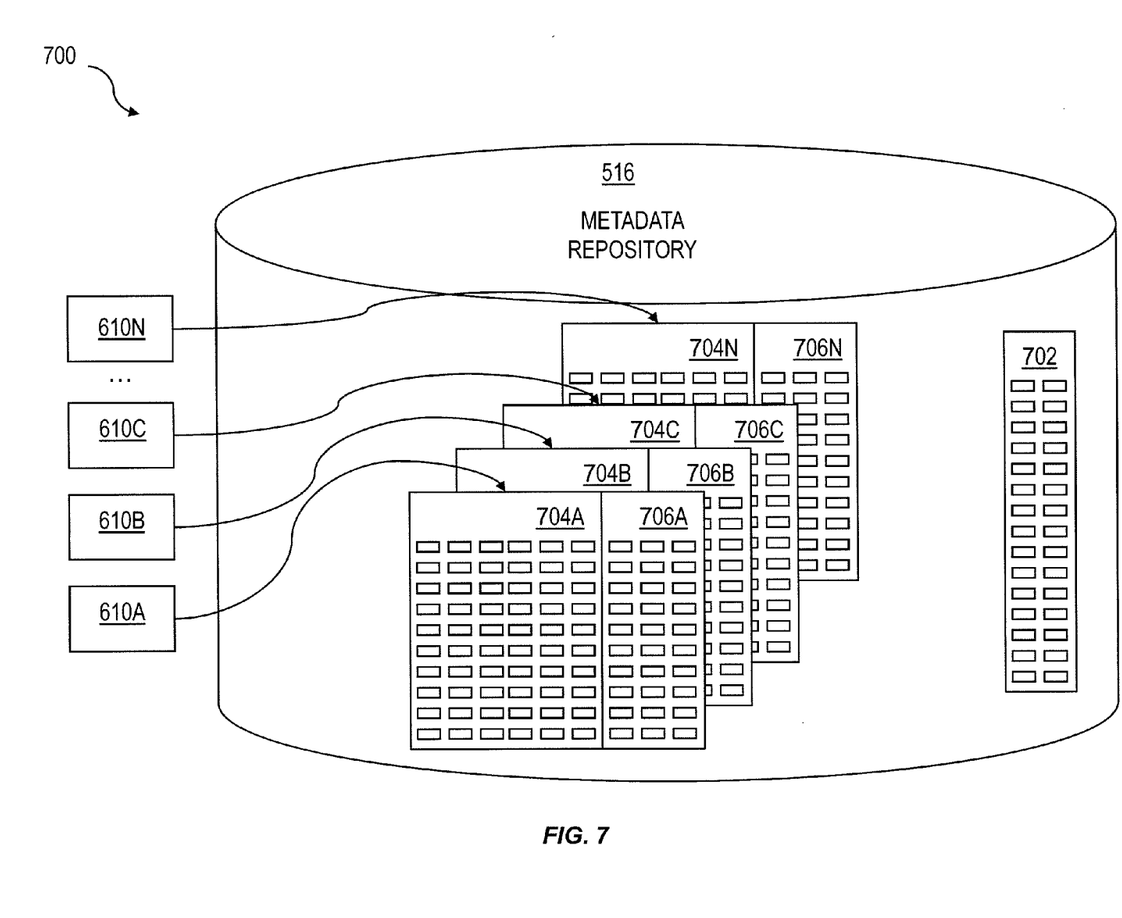
FIG. 7 is a diagram illustrating a data repository showing features consistent with implementations of the current subject matter.

To provide for customization of the business process for each of multiple organizations supported by a single software delivery architecture 600, the data and data objects stored in the metadata repository 516 and/or other data repositories that are accessed by the application server 602 can include three types of content as shown in FIG. 7: core software platform content 702 (e.g. a standard definition of a business process), system content 704 and tenant content 706. Core software platform content 702 includes content that represents core functionality and is not modifiable by a tenant. System content 704 can in some examples be created by the runtime of the core software platform and can include core data objects that store concrete data associated with specific instances of a given business process and that are modifiable with data provided by each tenant. The data retained in these data objects are tenant-specific: for example, each tenant 610A-610N can store information about its own inventory, sales order, etc. Tenant content 706A-706N includes data objects or extensions to other data objects that are customized for one specific tenant 610A-610N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 706 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 702 and system content 704 and tenant content 706 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   receiving a definition of a new user interface feature of a business software architecture, the business software architecture supporting a business configuration used by an organization, the business configuration comprising a business scenario that comprises a plurality of business process features having associated user interface features;
   modifying a rule in a scenario model of the business scenario to associate the new user interface feature with at least one of the plurality of business process features;
   detecting a selection of the at least one of the plurality of business process features, the selection being received as an input via a user interface presentable on a computer display device, the input comprising user interaction with at least one of a first plurality of user interface elements that are arranged in a linear order in a navigation pane of the user interface to represent at least some of the plurality of business process features of the business scenario, wherein the user interface elements are arranged in a linear progression to represent a linear sequence of the business scenario; and
   displaying, via the user interface concurrently with the navigation pane, a work frame comprising the new user interface feature.

2. A computer program product as in claim 1, wherein the receiving occurs via a process linkage editor displayed in the work pane upon selection of a linkage modification user interface element displayed in the navigation pane.

3. A computer program product as in claim 1, wherein the receiving occurs via a scenario linkage editor operable by a scenario administrator, the scenario administrator having received a scenario modification feedback entered in the user interface by a business user who lacks sufficient permissions to modify the scenario model.

4. A computer program product as in claim 3, wherein the scenario modification feedback comprises a request to incorporate the new user interface feature.

5. A computer program product as in claim 1, wherein the new user interface feature relates to an external functionality provided by an software component external to, but integrated into, a core software platform of the business software architecture, and wherein the modifying further comprises associating the external functionality with the business process feature.

6. A computer program product as in claim 1, wherein the operations further comprise:
   storing the scenario model; and
   supporting, using the scenario model, scenario navigation relevant to the business configuration, the scenario navigation providing an ability to directly change a link between one of the first plurality of user interface elements and its associated business process feature.

7. A system comprising:
   at least one programmable processor; and
   a machine-readable medium storing instructions that, when executed by the at least one programmable processor, cause the at least one programmable processor to perform operations comprising:
   receiving a definition of a new user interface feature of a business software architecture, the business software architecture supporting a business configuration used by an organization, the business configuration comprising a business scenario that comprises a plurality of business process features having associated user interface features;
   modifying a rule in a scenario model of the business scenario to associate the new user interface feature with at least one of the plurality of business process features;
   detecting a selection of the at least one of the plurality of business process features, the selection being received as an input via a user interface presentable on a computer display device, the input comprising user interaction with at least one of a first plurality of user interface elements that are arranged in a linear order in a navigation pane of the user interface to represent at least some of the plurality of business process features of the business scenario, wherein the user interface elements are arranged in a linear progression to represent a linear sequence of the business scenario; and
   displaying, via the user interface concurrently with the navigation pane, a work frame comprising the new user interface feature.

8. A system as in claim 7, wherein the receiving occurs via a process linkage editor displayed in the work pane upon selection of a linkage modification user interface element displayed in the navigation pane.

9. A system as in claim 7, wherein the receiving occurs via a scenario linkage editor operable by a scenario administrator, the scenario administrator having received a scenario modification feedback entered in the user interface by a business user who lacks sufficient permissions to modify the scenario model.

10. A system as in claim 9, wherein the scenario modification feedback comprises a request to incorporate the new user interface feature.

11. A system as in claim 7, wherein the new user interface feature relates to an external functionality provided by an software component external to, but integrated into, a core software platform of the business software architecture, and wherein the modifying further comprises associating the external functionality with the business process feature.

12. A system as in claim 7, wherein the operations further comprise:
   storing the scenario model; and
   supporting, using the scenario model, scenario navigation relevant to the business configuration, the scenario navigation providing an ability to directly change a link between one of the first plurality of user interface elements and its associated business process feature.

13. A computer-implemented method comprising:
   at least one programmable processor; and
   a machine-readable medium storing instructions that, when executed by the at least one programmable processor, cause the at least one programmable processor to perform operations comprising:
   receiving a definition of a new user interface feature of a business software architecture, the business software architecture supporting a business configuration used by an organization, the business configuration comprising a business scenario that comprises a plurality of business process features having associated user interface features;
   modifying a rule in a scenario model of the business scenario to associate the new user interface feature with at least one of the plurality of business process features;
   detecting a selection of the at least one of the plurality of business process features, the selection being received as an input via a user interface presentable on a computer display device, the input comprising user interaction with at least one of a first plurality of user interface elements that are arranged in a linear order in a navigation pane of the user interface to represent at least some of the plurality of business process features of the business scenario, wherein the user interface elements are arranged in a linear progression to represent a linear sequence of the business scenario; and
   displaying, via the user interface concurrently with the navigation pane, a work frame comprising the new user interface feature.

14. A computer-implemented method as in claim 13, wherein the receiving occurs via a process linkage editor displayed in the work pane upon selection of a linkage modification user interface element displayed in the navigation pane.

15. A computer-implemented method as in claim 13, wherein the receiving occurs via a scenario linkage editor operable by a scenario administrator, the scenario administrator having received a scenario modification feedback entered in the user interface by a business user who lacks sufficient permissions to modify the scenario model.

16. A computer-implemented method as in claim 15, wherein the scenario modification feedback comprises a request to incorporate the new user interface feature.

17. A computer-implemented method as in claim 13, wherein the new user interface feature relates to an external functionality provided by an software component external to, but integrated into, a core software platform of the business software architecture, and wherein the modifying further comprises associating the external functionality with the business process feature.

18. A computer-implemented method as in claim 13, further comprising:
   storing the scenario model; and
   supporting, using the scenario model, scenario navigation relevant to the business configuration, the scenario navigation providing an ability to directly change a link between one of the first plurality of user interface elements and its associated business process feature.

19. A computer-implemented method as in claim 13, wherein at least one of the receiving, the modifying, the detecting, and the displaying is performed by at least one programmable processor.

* * * * *